(12) United States Patent
Li et al.

(10) Patent No.: US 11,334,290 B2
(45) Date of Patent: May 17, 2022

(54) MEMORY STORAGE DEVICE AND MANAGEMENT METHOD THEREOF

(71) Applicant: PHISON ELECTRONICS CORP., Miaoli (TW)

(72) Inventors: Yi-Feng Li, Miaoli County (TW); Chao-Ta Huang, Miaoli (TW); Chun-Yu Ling, Miaoli (TW); Jia-Huei Yeh, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/820,733

(22) Filed: Mar. 17, 2020

(65) Prior Publication Data

US 2021/0263680 A1 Aug. 26, 2021

(30) Foreign Application Priority Data

Feb. 24, 2020 (TW) .................................. 109105784

(51) Int. Cl.
*G06F 13/42* (2006.01)
*G06F 3/06* (2006.01)

(52) U.S. Cl.
CPC .......... *G06F 3/0659* (2013.01); *G06F 3/0604* (2013.01); *G06F 3/0679* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| 8,990,472 | B2* | 3/2015 | Sela | G06F 13/4221 |
| | | | | 710/313 |
| 9,122,481 | B2* | 9/2015 | Unnikrishnan | G06F 1/3278 |
| 9,836,309 | B2* | 12/2017 | Lambert | G06F 13/4022 |
| 2017/0147525 | A1* | 5/2017 | Arroyo | G06F 13/36 |
| 2018/0253138 | A1* | 9/2018 | Bakshi | G06F 1/3287 |
| 2019/0205277 | A1* | 7/2019 | Koh | G06F 13/4081 |
| 2019/0227972 | A1* | 7/2019 | Hor | G06F 13/1652 |
| 2019/0250930 | A1* | 8/2019 | Erez | G06F 1/3281 |
| 2020/0097112 | A1* | 3/2020 | Seo | G06F 3/04166 |

FOREIGN PATENT DOCUMENTS

TW 201810060 3/2018
TW 201945884 12/2019

* cited by examiner

*Primary Examiner* — Elias Mamo
(74) *Attorney, Agent, or Firm* — JCIPRNET

(57) ABSTRACT

A management method for managing a memory storage device compatible with a PCIe (PCI Express) standard is disclosed. The memory storage device has a plurality of pins configured to couple to a host system. The management method includes: transmitting a first command to the memory storage device through at least one first pin among the pins to control the memory storage device to enter a target link status; and when the memory storage device is in the target link status, transmitting a second command to the memory storage device through a second pin among the pins to control the memory storage device to leave the target link status. The second pin is not a pin dedicated to control the memory storage device to enter or leave the target link status.

18 Claims, 5 Drawing Sheets

MEMORY STORAGE DEVICE AND MANAGEMENT METHOD THEREOF

CROSS-REFERENCE TO RELATED APPLICATION

This application claims the priority benefit of Taiwan application no. 109105784, filed on Feb. 24, 2020. The entirety of the above-mentioned patent application is hereby incorporated by reference herein and made a part of this specification.

TECHNICAL FIELD

The invention relates to a memory management technology, and more particularly, relates to a memory storage device and a management method thereof.

BACKGROUND

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

As the SIM card of a smart phone becomes smaller and smaller, a volume of a memory storage device also needs to be gradually reduced. However, at the present stage, there is no memory storage device on the market that can share a slot with a Nano-SIM card and is compatible with a PCIe (Peripheral Component Interconnect Express) standard. In particular, compared to an eMMC (Embedded Multi Media Card) standard, the PCIe standard provides higher data access speeds.

SUMMARY

An exemplary embodiment of the invention provides a memory storage device capable of sharing the slot with the Nano-SIM card.

An exemplary embodiment of the invention provides a management method of a memory storage device capable of controlling the memory storage device to enter or leave a target link status normally.

An exemplary embodiment of the invention provides a management method, which is used for managing a memory storage device compliance with a PCIe (Peripheral Component Interconnect Express) standard. The memory storage device has a plurality of pins configured to couple to a host system. The management method includes: transmitting a first command to the memory storage device through at least one first pin among the pins to control the memory storage device to enter a target link status; and when the memory storage device is in the target link status, transmitting a second command to the memory storage device through a second pin among the pins to control the memory storage device to leave the target link status. The second pin is not a pin dedicated to control the memory storage device to enter or leave the target link status.

An exemplary embodiment of the invention further provides a memory storage device compliance with a PCIe standard. The memory storage device includes a connection interface unit, a rewritable non-volatile memory module and a memory control circuit unit. The connection interface unit has a plurality of pins and is configured to couple to a host system. The memory control circuit unit is coupled to the connection interface unit and the rewritable non-volatile memory module. The memory control circuit unit is configured to receive a first command through at least one first pin among the pins and control the memory storage device to enter a target link status according to the first command. When the memory storage device is in the target link status, the memory control circuit unit is further configured to receive a second command through a second pin among the pins and control the memory storage device to leave the target link status according to the second command. The second pin is not a pin dedicated to control the memory storage device to enter or leave the target link status.

Based on the above, the memory storage device provided by the exemplary embodiments of the invention is compatible with the PCIe standard and may be coupled to the host system through multiple pins. At least one first pin among the pins may be used to transmit a first command to control the memory storage device to enter a target link status. When the memory storage device is in the target link status, a second pin among the pins may be used to transmit a second command to control the memory storage device to leave the target link status. In particular, the second pin is not a pin dedicated to control the memory storage device to enter or leave the target link status. As a result, even if the size and/or the total number of pins of the memory storage device are reduced, the memory storage device can still normally operate in various link statuses defined by the PCIe standard.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
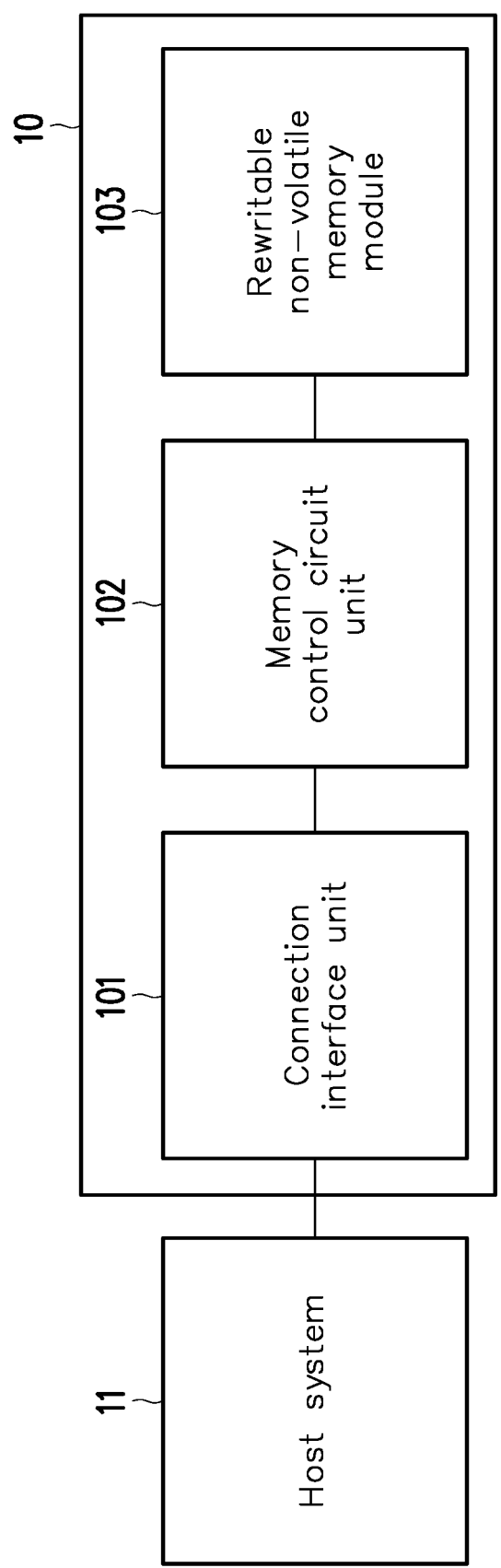
FIG. 1 is a schematic diagram illustrating a memory storage device and a host system according to an exemplary embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

FIG. 1 is a schematic diagram illustrating a memory storage device and a host system according to an exemplary embodiment of the invention. Referring to FIG. 1, a host system 11 may be a system in a smart phone, a digital camera, a video camera, a communication device, an audio player, a video layer or a tablet computer. A memory storage device 10 may be a storage device used by the host system 11.

The host system 11 may include a processor, a random access memory (RAM), a read only memory (ROM) and a data transmission interface. The host system 11 may be coupled to the memory storage device 10 through the data transmission interface. For example, the host system 11 may store data into the memory storage device 10 or read data from the memory storage device 10 via the data transmission interface.

The memory storage device 10 includes a connection interface unit 101, a memory control circuit unit 102 and a rewritable non-volatile memory module 103. The connection interface unit 101 is configured to couple the memory storage device 10 to the host system 11. The memory storage device 10 can communicate with the host system 11 through the connection interface unit 101. The connection interface unit 101 is compatible with a PCIe (Peripheral Component Interconnect Express) standard. In addition, the connection interface unit 101 and the memory control circuit unit 102 may be packaged into one chip, or the connection interface unit 101 is distributed outside of a chip containing the memory control circuit unit 102.

The memory control circuit unit 102 is configured to execute a plurality of logic gates or control commands which are implemented in a hardware form or in a firmware form and perform operations of writing, reading or erasing data in the rewritable non-volatile memory storage module 103 according to the commands of the host system 11. The memory control circuit unit 102 may include, for example, a central processing unit or other programmable microprocessor for general purpose or special purpose, a digital signal processor (DSP), a programmable controller, an application specific integrated circuit (ASIC), a programmable logic device (PLD) or other similar devices or a combination of above-mentioned devices. In an exemplary embodiment, the memory control circuit unit 102 is also known as a flash memory controller.

The rewritable non-volatile memory module 103 is coupled to the memory control circuit unit 102 and configured to store data written from the host system 11. The rewritable non-volatile memory module 103 may include a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a Quad Level Cell (MLC) NAND-type flash memory module (i.e., a flash memory module capable of storing four bits in one memory cell), other flash memory modules or other memory modules having the same features.

In the rewritable non-volatile memory module 103, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". With changes in the threshold voltage, each of the memory cells in the rewritable non-volatile memory module 103 has a plurality of storage states. The storage state to which the memory cell belongs may be determined by applying a read voltage to the memory cell, so as to obtain the one or more bits stored in the memory cell.

In an exemplary embodiment, the memory cells of the rewritable non-volatile memory module 103 may constitute a plurality of physical programming units, and the physical programming units may constitute a plurality of physical erasing units. Specifically, the memory cells on the same word line may constitute one or more of the physical programming units. If each of the memory cells can store two or more bits, the physical programming units on the same word line may be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In an exemplary embodiment, the physical programming unit is the minimum unit for programming. That is, the physical programming unit is the minimum unit for writing data. For example, the physical programming unit may be a physical page or a physical sector. If the physical programming unit is the physical page, these physical programming units may include a data bit area and a redundancy bit area. The data bit area contains multiple physical sectors configured to store user data, and the redundant bit area is configured to store system data (e.g., management data such as an error correcting code, etc.). In an exemplary embodiment, the data bit area contains 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block. In an exemplary embodiment, the rewritable non-volatile memory module 103 is also known as a flash memory module.

In an exemplary embodiment, the connection interface unit 101 includes a plurality of pins. The pins are conductive and may be disposed on a surface of the memory storage device 10. The memory storage device 10 may communicate with the host system 11 through the pins. For example, through the pins, the memory control circuit unit 102 may receive data from the host system 11, transmit data to the host system 11, receive a power signal from the host system 11, be grounded to the host system 11 and/or receive a reference clock signal from the host system 11.

In an exemplary embodiment, the host system 11 may transmit a specific command (a.k.a. a first command) to the memory storage device 10 through at least one specific pin (a.k.a. a first pin) among the pins to control the memory storage device 10 to enter a specific link status (a.k.a. a target link status). The target link status includes at least one link of statuses defined by the PCIe standard, such as L1, L1.1 and L1.2. In the target link status, a power consumption of the memory storage device 10 is reduced. In other words, the first command is used to control the memory storage device 10 to enter the target link status. When the first command is received, the memory control circuit unit 102 may control the memory storage device 10 to enter the target link status to reduce the power consumption of the device.

In an exemplary embodiment, when the memory storage device 10 is in the target link status, the host system 11 may transmit a specific command (a.k.a. a second command) to the memory storage device 10 through a specific pin (a.k.a. a second pin) among the pins to control the memory storage device 10 to leave the target link status. In other words, the second command is used to control the memory storage device 10 to leave the target link status. When the second command is received, the memory control circuit unit 102 may control the memory storage device 10 to leave the target link status, i.e., to return to the link status of L0. In an exemplary embodiment, the operation of controlling the memory storage device 10 to leave the target link status is equivalent to waking up the memory storage device 10.

It should be noted that, the second pin is not a pin dedicated to control the memory storage device 10 to enter or leave the target link status. For example, in a common memory storage device compatible with the PCIe standard, a pin CLKREQ # dedicated to wake up the memory storage device is generally provided. When the memory storage device enters the link status with low power consumption such as L1, L1.1, and/or L1.2, the host system may wake up the memory storage device by changing a voltage level of the pin CLKREQ #. However, in an exemplary embodiment, the memory storage device 10 may not be provided with the pin CLKREQ #. In an exemplary embodiment, by removing at least one pin including the pin CLKREQ #, a volume of the memory storage device 10 may be effectively reduced.

Figure 2:
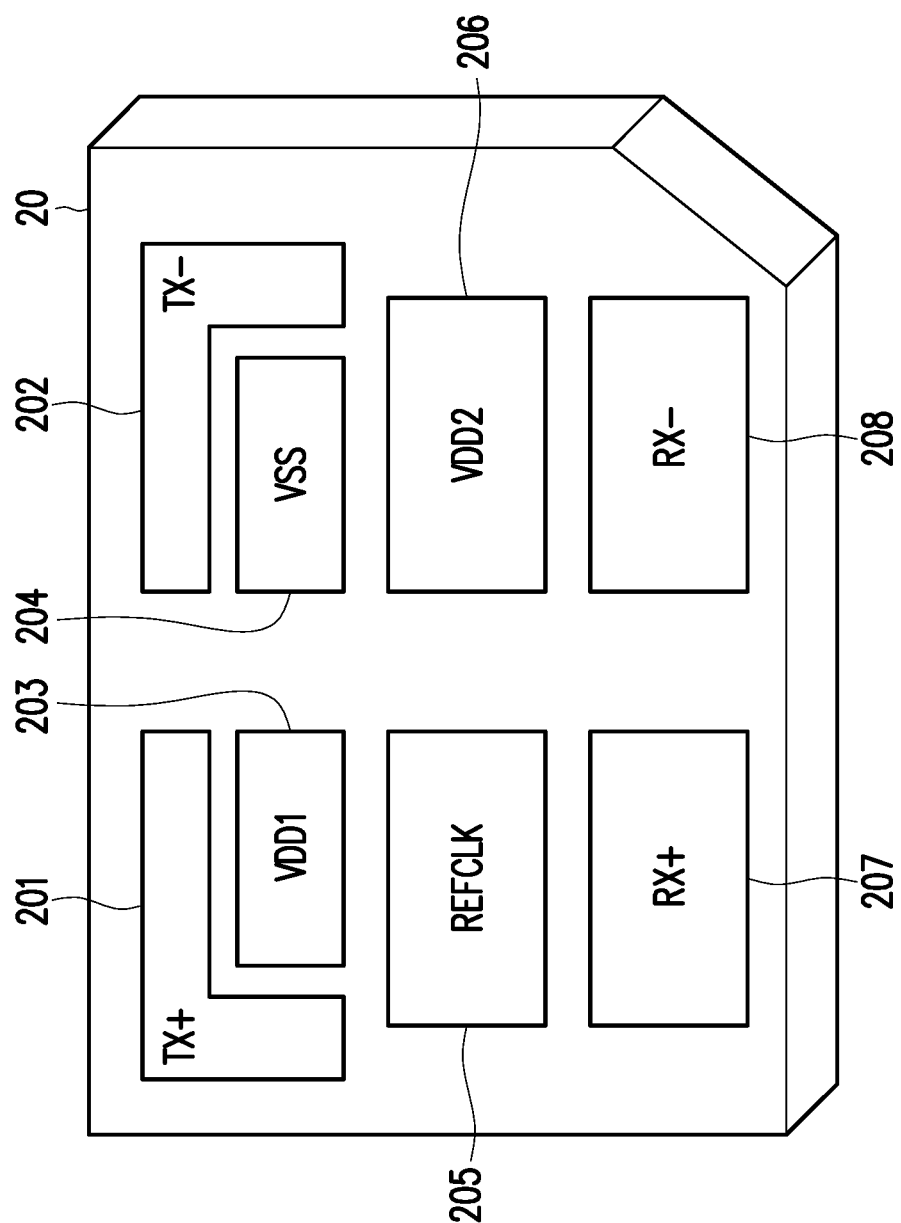
FIG. 2 is a schematic diagram illustrating a plurality of pins in a connection interface unit according to an exemplary embodiment of the invention.

FIG. 2 is a schematic diagram illustrating a plurality of pins in a connection interface unit according to an exemplary embodiment of the invention. Referring to FIG. 2, a memory storage device 20 may be identical or similar to the memory storage device 10 of FIG. 1.

In an exemplary embodiment, a connection interface unit of the memory storage device 20 has a plurality of pins 201 to 208. The memory storage device 20 may communicate with a host system (e.g., the host system 11 of FIG. 1) through the pins 201 to 208. In an exemplary embodiment, the pins 201 to 208 may be a pin TX+, a pin TX−, a pin VDD1, a pin VSS, a pin REFCLK, a pin VDD2, a pin RX+ and a pin RX− in this order.

The pins 201 and 202 (i.e., the pins TX+ and TX−) are configured to transmit a differential signal to the host system. The pins 203 and 206 (i.e., the pins VDD1 and VDD2) are configured to receive the power signal from the host system, respectively. For example, the pin 203 may be configured to receive the power signal of 3.3V (Volt) or 2.5V, and the pin 206 may be configured to receive the power signal of 1.8V or 1.2V. The pin 204 (i.e., the pin VSS) is configured to be grounded to the host system. The pin 205 (i.e., the pin REFCLK) is configured to receive the reference clock signal from the host system. The pins 207 and 208 (i.e., the pins RX+ and RX−) are configured to receive the differential signal from the host system.

It should be noted that, in an exemplary embodiment, the pin 205 is configured to receive a single-end reference clock signal, instead of being configured to transmit a differential clock signal like a pin REFCLK+ and/or a pin REFCLK− in the PCIe standard. Further, in the exemplary embodiment of FIG. 2, a total number of the pins 201 to 208 is 8. Compared with the general pins defined by the PCIe standard, the memory storage device 20 does not have pins VDD3, VSS4, VSS5, PERST #, CLKREQ # and REFCLK−.

In an exemplary embodiment, the first command may be transmitted from the host system to the memory storage device 20 in the form of differential signal through the pins 207 and 208 (i.e., the pins RX+ and RX−). The first command may be a specially designed developer command configured to control the memory storage device 20 to enter the target link status.

In an exemplary embodiment, when the memory storage device 20 is in the target link status, the second command may be transmitted from the host system to the memory storage device 20 in the form of non-differential signal through the pin 203 (i.e., the pin VDD1), the pin 206 (i.e., the pin VDD2) and/or the pin 205 (i.e., the pin REFCLK), so as to control the memory storage device 20 to leave the target link status. For example, the second command may be transmitted by a signal with a specific waveform or a specific signal pattern formed on the pin 203 (i.e., the pin VDD1), the pin 206 (i.e., the pin VDD2) and/or the pin 205 (i.e., the pin REFCLK).

Figure 3:
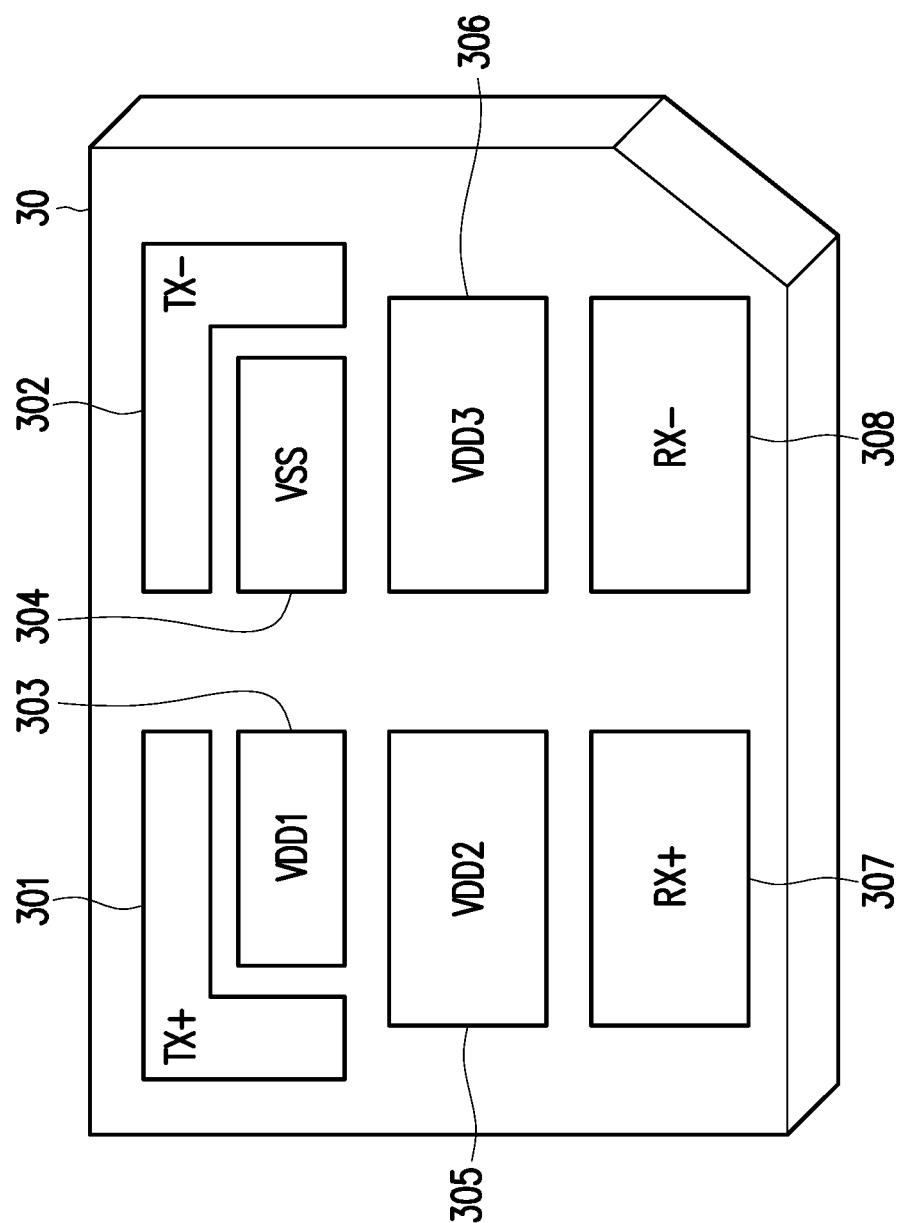
FIG. 3 is a schematic diagram illustrating a plurality of pins in a connection interface unit according to an exemplary embodiment of the invention.

FIG. 3 is a schematic diagram illustrating a plurality of pins in a connection interface unit according to an exemplary embodiment of the invention. Referring to FIG. 3, a memory storage device 30 may be identical or similar to the memory storage device 10 of FIG. 1.

In an exemplary embodiment, a connection interface unit of the memory storage device 30 has a plurality of pins 301 to 308. The memory storage device 30 may communicate with a host system (e.g., the host system 11 of FIG. 1) through the pins 301 to 308. In an exemplary embodiment, the pins 301 to 308 may be a pin TX+, a pin TX−, a pin VDD1, a pin VSS, a pin VDD2, a pin VDD3, a pin RX+ and a pin RX− in this order.

The pins 301 and 302 (i.e., the pins TX+ and TX−) are configured to transmit a differential signal to the host system. The pins 303, 305 and 306 (i.e., the pins VDD1, VDD2 and VDD3) are configured to receive the power signal from the host system, respectively. For example, the pin 303 may be configured to receive the power signal of 3.3V or 2.5V; the pin 305 may be configured to receive the power signal of 1.8V or 1.2V; and the pin 306 may be configured to receive the power signal of 0.8V or 0.9V. The pin 304 (i.e., the pin VSS) is configured to be grounded to the host system. The pins 307 and 308 (i.e., the pins RX+ and RX−) are configured to receive the differential signal from the host system.

In the exemplary embodiment of FIG. 3, a total number of the pins 301 to 308 is also 8. It should be noted that, compared with the exemplary embodiment of FIG. 2, the memory storage device 30 of FIG. 3 does not include the pin REFCLK. In other words, the memory storage device 30 may generate the reference clock signal by itself (e.g., generated by an oscillator in the memory storage device 30) instead of receiving the reference clock signal from the host system. In addition, compared with the general pins defined by the PCIe standard, the memory storage device 30 does not have pins VSS4, VSS5, PERST #, CLKREQ #, REFCLK+ and REFCLK−.

In an exemplary embodiment, the first command may be transmitted from the host system to the memory storage device 30 in the form of differential signal through the pins 307 and 308 (i.e., the pins RX+ and RX−), so as to control the memory storage device 30 to enter the target link status. Further, when the memory storage device 30 is in the target link status, the second command may be transmitted from the host system to the memory storage device 30 in the form of non-differential signal through the pin 303 (i.e., the pin VDD1), the pin 305 (i.e., the pin VDD2) and/or the pin 306 (i.e., the pin VDD3), so as to control the memory storage device 30 to leave the target link status. For example, the second command may be transmitted by a signal with a specific waveform or a specific signal pattern formed on the pin 303 (i.e., the pin VDD1), the pin 305 (i.e., the pin VDD2) and/or the pin 306 (i.e., the pin VDD3).

Figure 4:
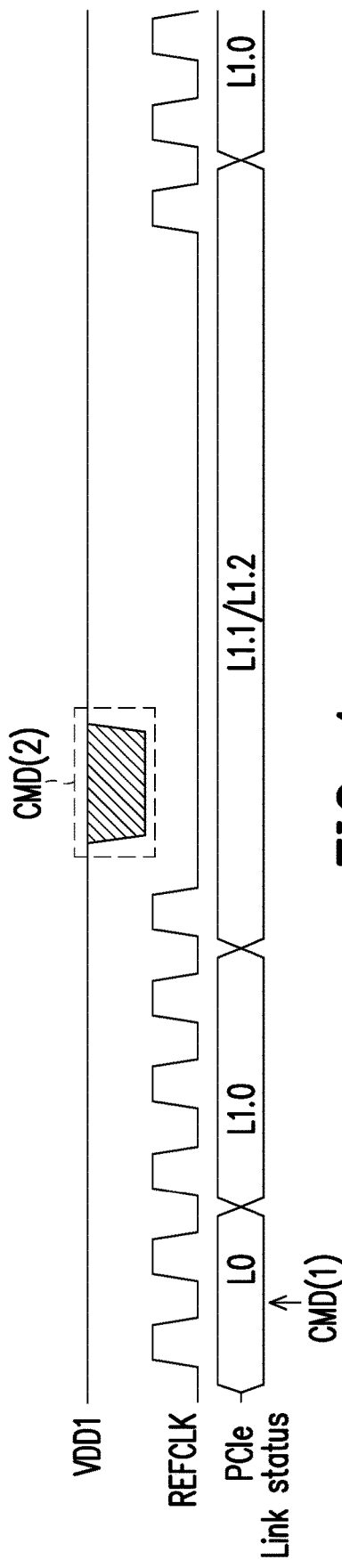
FIG. 4 is a schematic diagram illustrating a second command transmitted through a power signal according to an exemplary embodiment of the invention.

FIG. 4 is a schematic diagram illustrating a second command transmitted through a power signal according to an exemplary embodiment of the invention. Referring to FIG. 4, it is assumed that after a command CMD(1) (i.e., the first command) is received, a PCIe link status of the memory storage device is changed to the target link status such as L1, L1.1 and L1.2. Then, when the memory storage device detects a command CMD(2) (i.e., the second command) transmitted with a predefined specific waveform or a specific signal pattern appearing on the power signal on the pin VDD1, the memory storage device may be automatically woken up. For example, in this exemplary embodiment, a power signal having a voltage level less than a preset value is used as the specific waveform corresponding to the command CMD(2).

Figure 5:
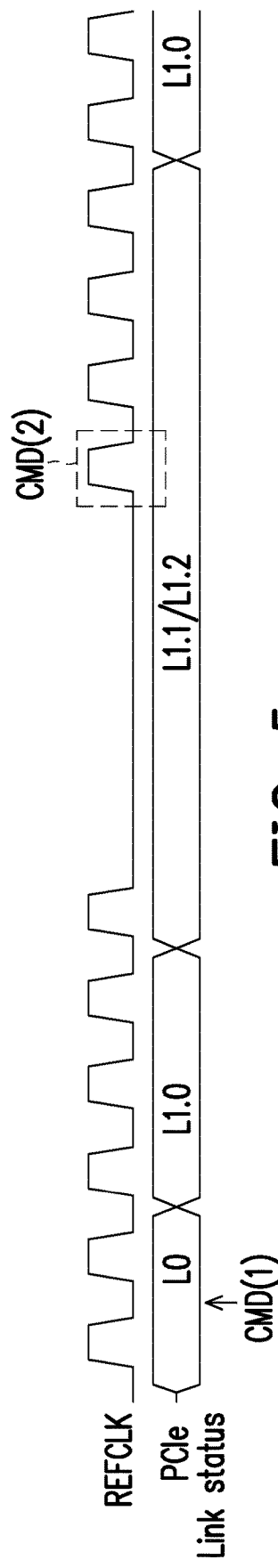
FIG. 5 is a schematic diagram illustrating a second command transmitted through a reference clock signal according to an exemplary embodiment of the invention.

FIG. 5 is a schematic diagram illustrating a second command transmitted through a reference clock signal according to an exemplary embodiment of the invention. Referring to FIG. 5, it is assumed that after a command CMD(1) (i.e., the first command) is received, a PCIe link status of the memory storage device is changed to the target link status such as L1, L1.1 and L1.2. At this time, the pin REFCLK suspends transmitting signals. Then, when the memory storage device detects the reference clock signal reappearing on the pin REFCLK, the memory storage device may determine that the command CMD(2) (i.e., the second command) is detected and may then be automatically woken up.

Figure 6:
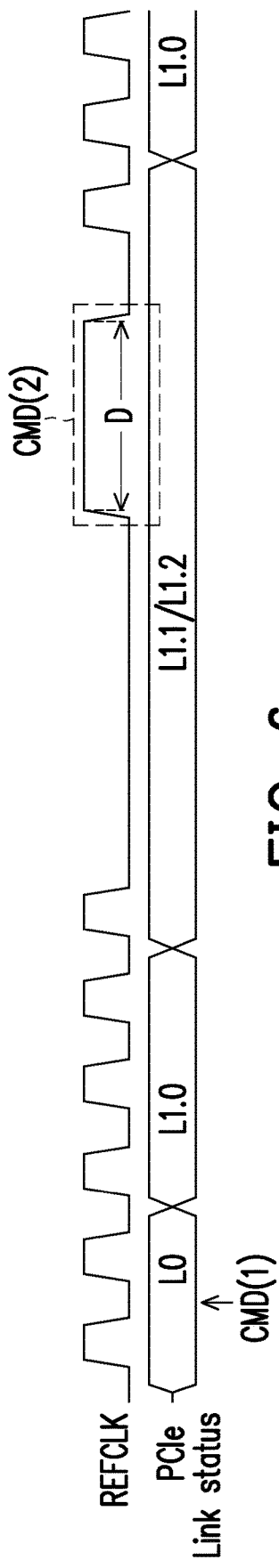
FIG. 6 is a schematic diagram illustrating a second command transmitted through a reference clock signal according to an exemplary embodiment of the invention.

FIG. 6 is a schematic diagram illustrating a second command transmitted through a reference clock signal according to an exemplary embodiment of the invention. Referring to FIG. 6, it is assumed that after a command CMD(1) (i.e., the first command) is received, a PCIe link status of the memory storage device is changed to the target link status such as L1, L1.1 and L1.2. At this time, the pin REFCLK suspends transmitting signals. Then, when the memory storage device detects the reference clock signal reappearing on the pin REFCLK and a pulse of the reference clock signal satisfies a specific condition (e.g., a pulse width is greater than a width D), the memory storage device may determine that the command CMD(2) (i.e., the second command) is detected and may then be automatically woken up.

It should be noted that, in the exemplary embodiments of FIG. 2 and FIG. 3, the pins at different positions may be swapped to meet practical requirements. In the exemplary embodiments of FIG. 2 and FIG. 3, the memory storage device compatible with the PCIe standard and capable of sharing the slot with the Nano-SIM card is used as an example for description. However, in another exemplary embodiment, the size and shape of the memory storage device, the total number of pins in the connection interface unit, and/or the definition and function of each pin may be changed to meet different specifications of the connection Interface and/or slot styles. In addition, the predefined specific waveforms or the specific signal patterns presented in FIG. 4 to FIG. 6 are merely examples, which may be adjusted according to practical requirements.

Figure 7:
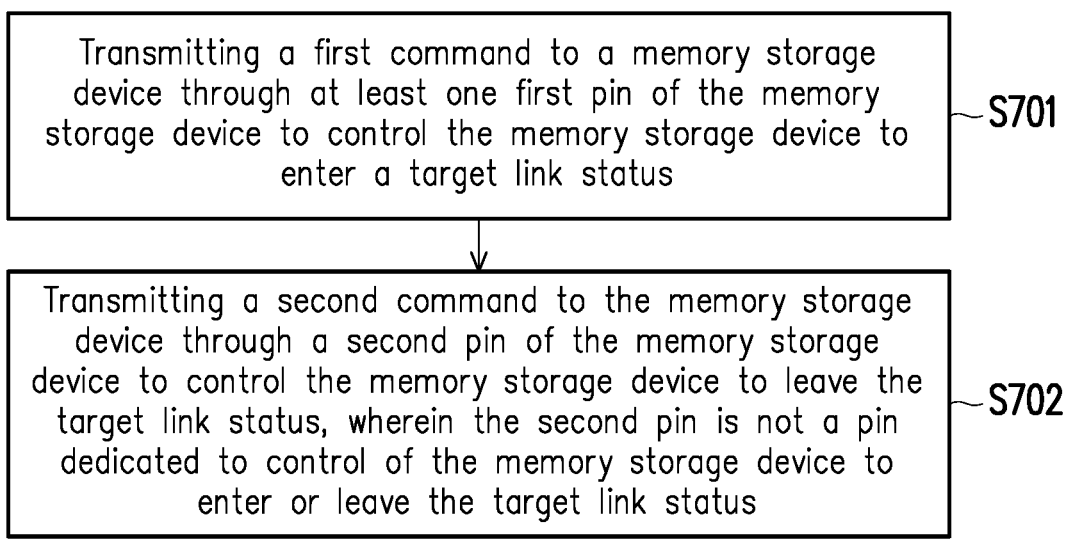
FIG. 7 is a flowchart illustrating a management method according to an exemplary embodiment of the disclosure.

FIG. 7 is a flowchart illustrating a management method according to an exemplary embodiment of the disclosure. Referring to FIG. 7, in step S701, a first command is transmitted to the memory storage device through at least one first pin of the memory storage device to control the memory storage device to enter a target link status. In step S702, when the memory storage device is in the target link status, a second command is transmitted to the memory storage device through a second pin of the memory storage device to control the memory storage device to leave the target link status. In particular, the second pin is not a pin dedicated to control the memory storage device to enter or leave the target link status.

Nevertheless, steps depicted in FIG. 7 are described in detail as above so that related description thereof is omitted hereinafter. It should be noted that, the steps depicted in FIG. 7 may be implemented as a plurality of program codes or circuits, which are not particularly limited in the invention. Moreover, the method disclosed in FIG. 7 may be implemented by reference with above exemplary embodiments, or may be implemented separately, which are not particularly limited in the invention.

In summary, the memory storage device provided by the exemplary embodiments of the invention is compatible with the PCIe standard and may be coupled to the host system through multiple pins. At least one first pin among the pins may be used to transmit a first command to control the memory storage device to enter a target link status. When the memory storage device is in the target link status, a second pin among the pins may be used to transmit a second command to control the memory storage device to leave the target link status. In particular, the second pin is not a pin dedicated to control the memory storage device to enter or leave the target link status. As a result, even if the size and/or the total number of pins of the memory storage device are reduced, the memory storage device can still normally operate in various link statuses defined by the PCIe standard.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A management method for managing a memory storage device compliance with a PCIe (Peripheral Component Interconnect Express) standard, the memory storage device having a plurality of pins configured to couple to a host system, the management method comprising:

transmitting a first command in the form of differential signal to the memory storage device through at least one first pin among the pins to control the memory storage device to enter a target link status; and when the memory storage device is in the target link status, transmitting a second command in the form of non-differential signal to the memory storage device through a second pin among the pins to control the memory storage device to leave the target link status,
wherein the second pin is not a pin dedicated to control the memory storage device to enter or leave the target link status.

2. The management method according to claim 1, wherein the first command is transmitted through a differential signal.

3. The management method according to claim 1, wherein the second command is not transmitted through a differential signal.

4. The management method according to claim 1, wherein the second pin is a pin configured to transmit a power signal or a pin configured to transmit a reference clock signal.

5. The management method according to claim 1, wherein a total number of the pins is 8.

6. The management method according to claim 5, wherein the pins are a pin VDD1, a pin VDD2, a pin VSS, a pin REFCLK, a pin TX+, a pin TX−, a pin RX+ and a pin RX−.

7. The management method according to claim 5, wherein the pins are a pin VDD1, a pin VDD2, a pin VDD3, a pin VSS, a pin TX+, a pin TX−, a pin RX+ and a pin RX−.

8. The management method according to claim 1, wherein the memory storage device does not include the pin dedicated to control the memory storage device to enter or leave the target link status.

9. The management method according to claim 1, wherein the target link status comprises one of L1, L1.1 and L1.2 defined by the PCIe standard.

10. A memory storage device compatible with a PCIe standard, the memory storage device comprising:
a connection interface unit, having a plurality of pins, wherein the pins are configured to couple to a host system;
a rewritable non-volatile memory module; and
a memory control circuit unit, coupled to the connection interface unit and the rewritable non-volatile memory module,
wherein the memory control circuit unit is configured to receive a first command in the form of differential signal through at least one first pin among the pins and control the memory storage device to enter a target link status according to the first command,
when the memory storage device is in the target link status, the memory control circuit unit is further configured to receive a second command in the form of non-differential signal through a second pin among the pins and control the memory storage device to leave the target link status according to the second command, and
the second pin is not a pin dedicated to control the memory storage device to enter or leave the target link status.

11. The memory storage device according to claim 10, wherein the first command is transmitted through a differential signal.

12. The memory storage device according to claim 10, wherein the second command is not transmitted through a differential signal.

13. The memory storage device according to claim 10, wherein the second pin is a pin configured to transmit a power signal or a pin configured to transmit a reference clock signal.

14. The memory storage device according to claim 10, wherein a total number of the pins is 8.

15. The memory storage device according to claim 14, wherein the pins are a pin VDD1, a pin VDD2, a pin VSS, a pin REFCLK, a pin TX+, a pin TX−, a pin RX+ and a pin RX−.

16. The memory storage device according to claim 14, wherein the pins are a pin VDD1, a pin VDD2, a pin VDD3, a pin VSS, a pin TX+, a pin TX−, a pin RX+ and a pin RX−.

17. The memory storage device according to claim 10, wherein the memory storage device does not include the pin dedicated to control the memory storage device to enter or leave the target link status.

18. The memory storage device according to claim 10, wherein the target link status comprises one of L1, L1.1 and L1.2 defined by the PCIe standard.

* * * * *